Sept. 27, 1949.  E. C. LANA ET AL  2,482,984
TIRE PRESSURE ALARM SWITCH
Filed March 17, 1947

Edward C. Lana
Garnet L. Lana
INVENTORS

BY

ATTORNEY

Patented Sept. 27, 1949

2,482,984

UNITED STATES PATENT OFFICE 2,482,984

TIRE PRESSURE ALARM SWITCH

Edward C. Lana and Garnet L. Lana,
Los Angeles, Calif.

Application March 17, 1947, Serial No. 735,190

6 Claims. (Cl. 200—58)

1

This invention relates generally to a tire pressure alarm and more particularly to a vehicle tire pressure-responsive means adapted to be mounted upon the valve stems of the pneumatic tires mounted on the wheels of a vehicle, such as an automobile, truck, or the like. The pressure-responsive means is adapted to close an electrical circuit whenever the pressure within the tire falls to a predetermined minimum, the closure of the electrical circuit corresponding to a given tire causing the electrical energizing of a signal means, such as a light, for example, located on the dash board of the vehicle, so that the operator of the vehicle may be made aware of the fact that the pressure within a particular pneumatic tire has fallen to a dangerously low value and may take appropriate steps before the tire becomes completely flat. As an example, in a four-wheel vehicle, such as an automobile, four small signal lights may be positioned on the dash board of a car labeled "left front," "right front," "left rear," "right rear," the four lights corresponding to the four tires of the car and lighting up in response to the deflation of the corresponding tire to a predetermined minimum pressure.

Prior art tire pressure alarms have numerous disadvantages. Among these is the fact that they are non-adjustable. It is difficult to calibrate the individual pressure-responsive means mounted upon the various valve stems so that electrical contact will take place when the tire pressure falls to a predetermined minimum. A second disadvantage of prior art constructions is the fact that the centrifugal force exerted when the car is moving and the wheels are rotating at relatively high speed, has interfered with the correct action of the apparatus in many cases or has altered the predetermined minimum pressure at which the apparatus effectively operates. Moreover, since the devices were bulky, the wheels were unbalanced and caused vibration and tire wear. Another disadvantage of most prior art constructions is the fact that they are of relatively expensive construction prone to get out of adjustment and impractical for hard usage.

Generally speaking, the apparatus of this invention comprises pressure-responsive means arranged for attachment to a valve stem of a pneumatic tire comprising a body portion including a recess, a hollow expansible member positioned in the recess, a virtually C-shaped, resilient, electrical connecting element between the walls of the recess and the hollow member, means for holding one end of the element in fixed position,

2 said means including an electric terminal, an adjustably positionable electric terminal member arranged to contact the free end of the connecting element when the pressure in the expansible member reaches a predetermined minimum, a signal, and means for effectively connecting the electrical connecting element to the signal.

The apparatus of this invention has none of the hereinabove-mentioned disadvantages. The pressure-responsive means may be readily adjusted so that electrical contact will take place at any desired minimum pressure. The apparatus, including the electrical connecting element, is in a plane perpendicular to the plane of rotation of the wheel and therefore perpendicular to the centrifugal force so that the centrifugal force of the rotating wheel does not interfere with the proper function of the apparatus. Furthermore, the apparatus is of very simple, cheap, foolproof construction and eminently practical.

With the above points in mind, it is an object of this invention to provide a new and improved tire pressure alarm adapted to signal the operator of a vehicle when a tire has fallen to a predetermined minimum pressure and to indicate which tire is involved.

It is a further object of this invention to provide a new and novel electrical tire pressure alarm, including pressure-responsive means, which may be adjusted so that the apparatus will function at any desired predetermined minimum pressure.

It is a further object of this invention to provide a new and improved electrically energized tire pressure alarm which will positively function at the predetermined minimum pressure, irrespective of the centrifugal force exerted by a rotating wheel.

It is a further object of this invention to provide a new and improved electrically energized tire pressure alarm of exceedingly simple, cheap and foolproof construction.

Other and allied objects will become apparent to those skilled in the art from a study of the illustrations, specification, and appended claims. To facilitate understanding, reference will be had to the following drawings, in which:

Figure 1:
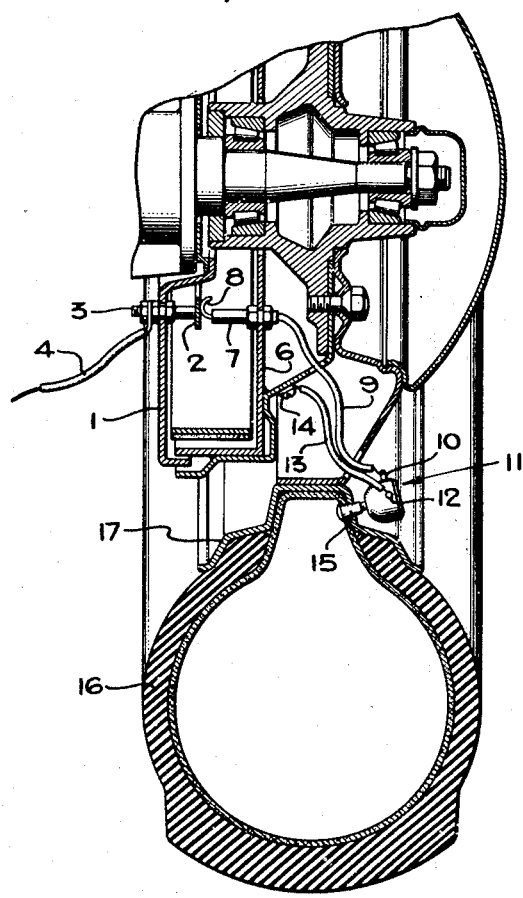
Fig. 1 is a fragmentary section of an illustrative form of this invention through a wheel mounted with respect to the axle of a vehicle and showing the brake drum associated therewith and the tire mounted upon the wheel with the pressure-responsive means of the present invention mounted on the valve stem thereof.

More specifically, referring to Fig. 1, a stationary brake drum portion 1, which is fixed with respect to the frame of a vehicle, has mounted thereon a continuous annular ring 2 comprising an electric contact which is connected to the post 3 which is electrically connected to lead 4. The post 3 is also insulated, by means not shown, such as a rubber grommet or the like, from the stationary portion of the brake drum where it passes therethrough.

The rotatable portion 6 of the brake drum which is attached to the wheel has mounted therein a member 7, the outer end of which has an electrical contacting brush 8 mounted thereon adapted to make contact with the continuous ring 2. The other end of the member 7 is connected to the lead 9, the opposite end of which is connected to the electric terminal 10 of the pressure-responsive means, indicated generally at 11. The other electric terminal 12 of the pressure-responsive means 11 is connected by lead 13 to ground at 14. It should be noted that the pressure-responsive means is threadably engaged and mounted upon a valve stem 15 of a tire 16 which is mounted on the rim 17 of a wheel.

It can be seen that the electric circuit just described is effectively operatively connected irrespective of whether the wheel is stationary with respect to the vehicle or is rotating with respect thereto, since as said wheel is rotating with respect to the vehicle, the rotating portion 6 of the brake drum will rotate with respect to the stationary portion 1 thereof, which will cause the brush 8 mounted on the rotating portion 6 of the brake drum to rotate in sliding electrical contact with the continuous ring 2 mounted on the stationary portion 1 of the brake drum, thus maintaining electrical contact at all times. The other portion of the circuit goes through ground as hereinbefore described and is connected at all times.

Figure 2:
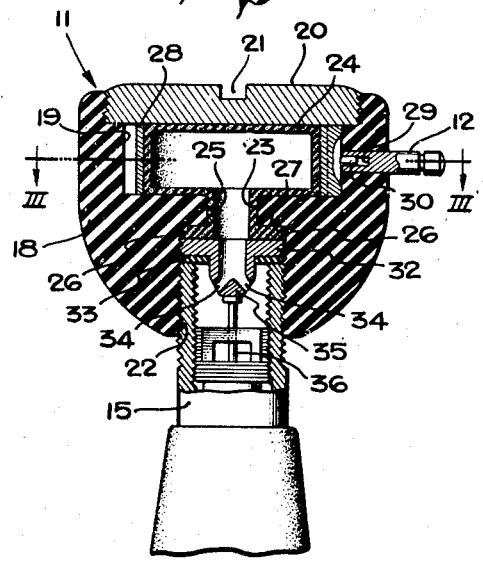
Fig. 2 is a vertical section of an illustrative form of the pressure-responsive means of this invention shown threadably mounted upon a valve stem which is connected to the tire, not shown.

Referring to Fig. 2, the body portion 18 of the pressure-responsive means 11 is provided with a relatively shallow cylindrical recess 19 in one end thereof. A cap 20 is adapted to be threadably engaged with the body portion 18 to effect a closure of the recess. The cap 20 is provided with a slot 21 therein for facilitating the threadable engagement or disengagement of the cap 20 with the body portion 18. At the end thereof opposite from the recess 19, the body 18 is provided with an internally threaded bore 22 which is connected by a narrow restricted passageway 23 to the recess 19. The body portion may be made of any suitable material but the use of a plastic dielectric composition reduces weight and simplifies construction.

Mounted within the recess 19 is an expansible, hollow member 24, preferably made from rubber or some other suitable resilient material, provided with a flanged neck 25, the neck 25 being adapted to extend through the restricted passageway 23 in the body portion 18, with the flange 26 thereof engaging the shoulder 27 formed at the junction of the restricted passageway 23 and the larger bore 22.

Figure 3:
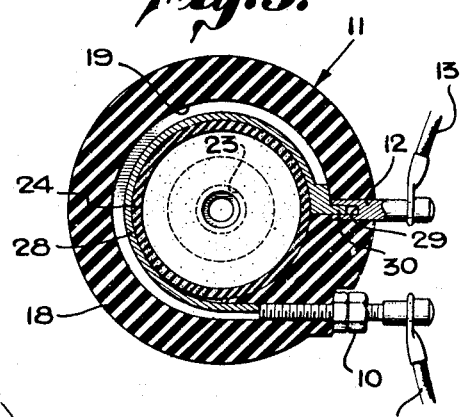
Fig. 3 is a horizontal section taken along III—III of Fig. 2.

Referring to Figs. 2 and 3, a virtually C-shaped, resilient, electrical conducting element 28, preferably made of metal, is positioned between the walls of the recess 19 and the hollow member 24, and partially, circumferentially extending therearound. Means for holding one end of the C-shaped electrical connecting element 28, comprising the electric terminal 12, is mounted radially in the body portion 18, the electric terminal 12 being provided with a recess 29 therein adapted to receive a tit 30 therein for locking said end of element 28 with respect thereto and being connected to the lead 13 which is connected to ground at 14 (shown in Fig. 1). The other end of the electric connecting element 28 is free and is positioned adjacent the threadably adjustable or positionable electric terminal member 10 and is adapted to make contact therewith when pressure within the expansible member 24 falls to a predetermined minimum. The terminal 10, as hereinbefore mentioned, is connected to the lead 9 which goes to the brush contact 8, circular ring contact 2, connecting post 3 and lead 4 (shown in Fig. 1). It should be noted that the free end of the C-shaped electrical connecting element 28 is colinear with the direction of movement of the adjustable electric terminal 10 which makes it possible to readily adjust same so that electric contact will be made at any desired minimum pressure within the expansible hollow member 24.

Referring to Fig. 2, the internally threaded bore 22 in the bottom of the body 18 is adapted to be engaged with externally threaded valve stem 15 with a valve-actuating element 32 and a sealing washer 33, preferably of rubber, positioned between the upper end of the valve stem 15 and the flange 26 of the hollow, expansible member 24. When the valve stem 15 is firmly screwed into the threaded bore 22 and fitted against the washer 33, an air-tight seal is effected. It should be noted that the valve-actuating element 32 is provided with openings 34 extending down into the inside of the valve stem 15 and with a head 35 thereon adapted to abut and downwardly move the valve-opening rod 36, thus effectively connecting the hollow, expansible member 24 to the interior of the tire whenever the assembly 11 is connected to the valve stem 15.

It should be noted that the C-shaped electrical connecting element 28 is normally spring-biased inwardly away from walls of recess 19. However, when the pressure-responsive means 11 is firmly threadably engaged with the valve stem 15 the air pressure within the tire communicating with the hollow, expansible member expands same and outwardly moves the C-shaped electrical connecting element 28 which moves the free end thereof away from the electric terminal 10. Thus the electric circuit is disconnected. However, as soon as the pressure within the tire falls to a predetermined, dangerously low minimum pressure, occasioned by loss of air in the tire through leaks or otherwise, the hollow, expansible member 24 will have decreased in size sufficiently to allow the inwardly biased C-shaped electrical connecting element 28 to make electric contact with the electric terminal 10, thus closing the electric circuit and energizing signal means positioned on the dash board of the vehicle where the operator may observe same. As best shown in Fig. 3 the free movable end of 28 may move in a slot so as to be out of contact with the rubber sack 24 and prevent pinching of such sack.

Figure 4:
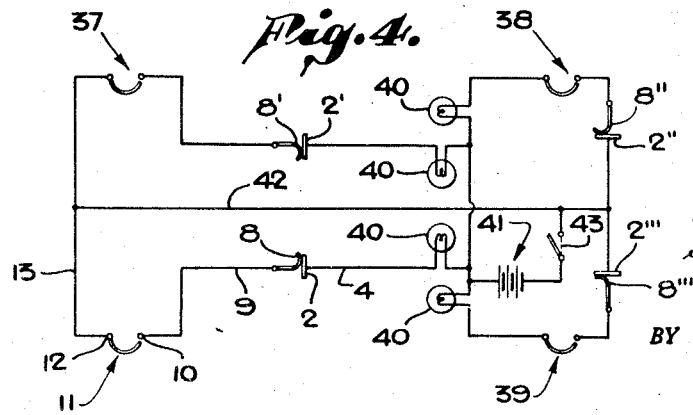
Fig. 4 is a diagrammatic, electric, schematic drawing illustrating one form of electrical circuit arrangement which may be utilized in this invention.

Referring to Fig. 4, a diagrammatic, electrical, schematic circuit is shown illustrating one form which the electrical apparatus of the invention may take. As can be seen, four pressure-responsive means are indicated diagrammatically, 11, 37, 38, and 39, corresponding respectively to the right rear wheel, the left rear wheel, the right front wheel and the left front wheel, and adapted to be mounted on the valve stems of the tires mounted on said wheels in a manner similar to that hereinbefore described in connection with the pressure-responsive means 11. The electric circuit of the single pressure-responsive means 11 only will be described, since the other circuits are similar.

The terminal 10 is connected through lead 9, brush 8 and ring 2 to a lamp or other suitable electrically energizable signal means 40, which is preferably situated on the dash board of the vehicle. The other terminal of the lamp 40 is connected to the positive terminal of a battery 41, or other suitable electric power supply. The terminal 12 of the pressure-responsive switch means 11 is connected to lead 13, which, in Fig. 4, is shown connected through a lead 42 and a switch 43 to the negative terminal of the battery 41. This is a diagrammatic equivalent circuit only, since in the apparatus as described in Figs. 1, 2 and 3, the lead 13 is grounded and the negative terminal of the battery 41 is grounded, the lead 42 in Fig. 4 corresponding to the connection of the circuits through ground. The switch 43 is purely optional. It may be desirable to disconnect the circuit at will, such as when storing the vehicle or the like. The balance of the pressure-responsive switch means 37, 38, 39 all function in a manner similar to that just described.

In the event normal tire pressure is of the order of 35 p. s. i., the terminal 10 may be adjusted (and held by its lock nuts) to cause the alarm to signal when pressure drops to 20 or 25 p. s. i. thereby allowing the operator to take steps to correct the condition before the tire is damaged.

Numerous modifications and variations of this invention are possible and are intended to be comprehended and included in the scope hereof. For example, the pressure-responsive switch means may be modified within wide limits without departing from the spirit of the invention. The means for electrically connecting the pressure-responsive switch means with the signal means on the dash board of the vehicle may be modified within wide limits. The signal means mounted upon the dash board may comprise any electrically energizable indicator or annunciator. Numerous other electrical circuit arrangements may be utilized in this invention.

The examples described and illustrated herein are exemplary only and are not intended to limit the scope of this invention, which is to be interpreted in the light of the appended claims only.

We claim:

1. A pressure-responsive circuit closer for a vehicle tire pressure signal means, attached to a valve stem of a tire on a wheel, comprising: a body portion of dielectric material, including a relatively shallow, cylindrical recess in one end, an internally threaded bore at the other end, and a restricted passageway connecting the bore and the recess; an expansible, hollow member provided with a flanged neck, said member being positioned in the recess with its neck extending through the passageway; a C-shaped, resilient, metallic element between the walls of the recess and the hollow member; means for holding one end of the element in fixed position, said means including an electric terminal; and an adjustably positionable terminal member arranged to contact the free end of the element when the pressure in the expansible member reaches a predetermined minimum.

2. A pressure-responsive circuit closer for a vehicle tire pressure signal means, arranged for attachment to the valve stem of a pneumatic tire, comprising: a body portion including a recess therein; an expansible hollow member positioned in said recess; a virtually C-shaped, resilient, inwardly biased electrical connecting element between the walls of the recess and the hollow member; means for holding one end of the element in a fixed position, including an electric terminal; and an adjustably positionable electric terminal member arranged to contact the free end of the element when the pressure in the expansible member reaches a predetermined minimum.

3. A pressure-responsive circuit closer for a vehicle tire pressure signal means arranged for attachment to a valve stem of a pneumatic tire, comprising: a body portion including a relatively shallow, cylindrical recess in one end; an internally threaded bore in the other end; a passageway connecting the bore and the recess; an expansible, hollow member provided with a flanged neck, said member being positioned in the recess with its neck extending through the passageway; a C-shaped, resilient, metallic element between the walls of the recess and the hollow member; means for holding one end of the element in fixed position, said means including an electric terminal; and a terminal member arranged to contact the free end of the element when the pressure in the expansible member reaches a predetermined minimum.

4. A pressure-responsive circuit closer for a vehicle tire pressure signal means arranged for attachment to a valve stem of a pneumatic tire, comprising: a body portion including a relatively shallow, cylindrical recess in one end; an internally threaded bore in the other end; a passageway connecting the bore and the recess; an expansible, hollow member provided with a flanged neck, said member being positioned in the recess with its neck extending through the passageway; a C-shaped, resilient, metallic element between the walls of the recess and the hollow member; means for holding a portion of the element in fixed position, said means including an electric terminal; and a terminal member arranged to contact a movable portion of the element when the pressure in the expansible member reaches a predetermined value.

5. A pressure-responsive circuit closer for a vehicle tire pressure signal means arranged for attachment to the valve stem of a pneumatic tire, comprising: a body portion including a recess therein; an expansible, hollow member positioned in said recess; a virtually C-shaped, resilient, inwardly biased electrical connecting element between the walls of the recess and the hollow member; means for holding a portion of the element in fixed position, including an electrical terminal; and an electric terminal member arranged to contact a movable portion of the element when the pressure in the expansible member reaches a predetermined value.

6. A pressure-responsive circuit closer for a vehicle tire pressure signal means arranged for attachment to the valve stem of a pneumatic tire, comprising: a body portion including a recess therein; an expansible, hollow member positioned in said recess; a radially expansible and contractable resilient, metallic element between the walls of the recess and the hollow member; electrical contact means arranged to close a circuit through said metallic element when the pressure in the expansible member is at a predetermined value.

EDWARD C. LANA.
GARNET L. LANA.

REFERENCES CITED

The following references are of record in the file of this patent:

UNITED STATES PATENTS

| Number | Name | Date |
| --- | --- | --- |
| 820,041 | Ferdinand | May 8, 1906 |
| 1,144,834 | Freeman | June 29, 1915 |
| 1,410,297 | Harman | Mar. 21, 1922 |
| 1,890,376 | Gewecke | Dec. 6, 1932 |
| 2,113,957 | Androsky | Apr. 12, 1938 |